(12) United States Patent
Paluszek et al.

(10) Patent No.: US 8,193,657 B2
(45) Date of Patent: Jun. 5, 2012

(54) VERTICAL AXIS WIND TURBINE USING INDIVIDUAL BLADE PITCH AND CAMBER CONTROL INTEGRATED WITH MATRIX CONVERTER

(75) Inventors: Michael A. Paluszek, Princeton, NJ (US); Pradeep Bhatta, Plainsboro, NJ (US)

(73) Assignees: Michael A. Paluszek, Princeton, NJ (US); Princeton Satellite Systems, Inc., Princeton, NJ (US)

( * ) Notice: Subject to any disclaimer, the term of this patent is extended or adjusted under 35 U.S.C. 154(b) by 298 days.

(21) Appl. No.: 12/424,160

(22) Filed: Apr. 15, 2009

(65) Prior Publication Data

US 2010/0096854 A1  Apr. 22, 2010

Related U.S. Application Data

(60) Provisional application No. 61/044,988, filed on Apr. 15, 2008.

(51) Int. Cl.
*F03D 9/00* (2006.01)

(52) U.S. Cl. .......................................... 290/55; 416/119

(58) Field of Classification Search ................... 290/44, 290/55; 416/147, 1
See application file for complete search history.

(56) References Cited

U.S. PATENT DOCUMENTS

| | | | |
|---|---|---|---|
| 1,835,018 A | 12/1931 | Darrieus | |
| 4,162,410 A | 7/1979 | Amick | |
| 4,247,253 A | 1/1981 | Seki et al. | |
| 4,334,823 A * | 6/1982 | Sharp | 416/119 |
| 4,500,257 A | 2/1985 | Sullivan | |
| 5,183,386 A * | 2/1993 | Feldman et al. | 416/119 |
| 5,375,324 A | 12/1994 | Wallace et al. | |
| 5,503,525 A | 4/1996 | Brown et al. | |
| 5,676,524 A | 10/1997 | Lukas | |
| 6,320,273 B1 * | 11/2001 | Nemec | 290/55 |
| 6,688,842 B2 | 2/2004 | Boatner | |
| 6,942,454 B2 | 9/2005 | Ohlmann | |
| 7,189,050 B2 | 3/2007 | Taylor et al. | |
| 7,275,719 B2 * | 10/2007 | Olson | 244/155 A |
| 7,365,448 B2 * | 4/2008 | Stephens | 290/55 |
| 2006/0055175 A1 * | 3/2006 | Grinblat | 290/54 |
| 2007/0296218 A1 | 12/2007 | Jonsson | |
| 2009/0074578 A1 * | 3/2009 | Dewar et al. | 416/147 |
| 2010/0314885 A1 * | 12/2010 | Presz et al. | 290/55 |

* cited by examiner

*Primary Examiner* — Michael Zarroli

(57) ABSTRACT

A vertical axis wind turbine that can be actively controlled is provided. This invention includes mechanisms and methods for enabling high-efficiency wind energy extraction by a vertical axis wind turbine using active pitch and camber control of individual blades. Blade control is further integrated with generator control and power electronics. Integrated control algorithms are systematically constructed, and transmitted to the wind turbine through a wireless communications interface. The interface also allows the user to continuously monitor the state of the wind turbine system. This invention includes sensors and procedures for periodic self-calibration of wind turbine parameters for preserving the long-term efficiency of wind energy extraction. Furthermore, a capability to intelligently interact with other wind turbine systems in a wind-farm setting is incorporated.

2 Claims, 6 Drawing Sheets

VERTICAL AXIS WIND TURBINE USING INDIVIDUAL BLADE PITCH AND CAMBER CONTROL INTEGRATED WITH MATRIX CONVERTER

CROSS REFERENCE TO RELATED APPLICATIONS

This application is related to, and claims priority from, U.S. provisional application 61/044,988 filed on Apr. 15, 2008 by Michael A. Paluszek and Pradeep Bhatta entitled "VERTICAL AXIS WIND TURBINE USING INDIVIDUAL BLADE PITCH AND CAMBER CONTROL INTEGRATED WITH A MATRIX CONVERTER", the contents of which are hereby incorporated by reference.

FIELD OF THE INVENTION

The present invention relates to improvement of energy extraction efficiency of small-scale wind turbines, particularly vertical axis wind turbines, using active blade actuation and integration with matrix power converters.

BACKGROUND OF THE INVENTION

This invention relates to wind turbines. Wind turbines tap energy from the wind, and provide electrical energy that can be consumed locally or fed into the electrical grid. Wind energy contributes to the energy security of the United States and the rest of the world as an inexhaustible, domestic resource, thereby reducing dependence on natural gas, oil and other fossil fuels. The proposed invention will provide a means of distributed harvesting of this resource in an economically viable manner.

Wind turbines can be broadly classified based on the orientation of the axis of rotation of the rotor. The common type is the horizontal axis wind turbine (HAWT). This invention pertains to a vertical axis wind turbine (VAWT), which are attractive for suburban applications. While HAWTs are considered to have higher efficiency, they are sensitive to the direction of the wind, and also have a smaller range of wind speeds in which they can generate electric power. For domestic applications HAWTs tend to be too tall and often require expensive installation and maintenance. Previously developed VAWTs have low efficiencies, making them less attractive to suburban dwellers. Nonetheless VAWTs have some inherent advantages—they are insensitive to wind direction and require simpler installation. The proposed invention adds to the attractiveness of VAWTs by enabling higher efficiencies of energy extraction.

An early form of VAWT was the Darrieus turbine, described in U.S. Pat. No. 1,835,018 issued Dec. 8, 1931 to Darrieus. The Darrieus turbine has characteristic C-shaped blades that are connected at the top and bottom of the vertical axle. Its shape is commonly compared with that of an egg-beater. An improved version of the Darrieus turbine that incorporated upper and lower contours separated by radial stator vanes was described in U.S. Pat. No. 4,162,410 issued Jul. 24, 1979 to Amick. The Darrieus turbine is not widely used today because of its low efficiencies and structural problems.

More recently composite blades have been commonly used in VAWTs. U.S. Pat. No. 5,375,324 issued Dec. 27, 1994 to Wallace, et al. describes a pultruded composite blade for a Darrieus type wind turbine. The blade is a composite structure with a uniform cross-section with reinforcing fibers. A description of a self-erecting structure and erecting method is included.

Most VAWTs proposed in the past have fixed blades—blades that are fixed with respect to a support structure that attaches them to the main rotor. Guide vanes and deflector flaps are used to direct the wind, as described in U.S. Pat. No. 6,942,454 issued Sep. 13, 2005 to Ohlmann. There have been recent developments in creating systems that allow pivoting motion of blades, thereby enabling individual blade pitch control. U.S. Pat. No. 6,688,842 issued Feb. 10, 2004 to Boatner describes a vertical axis wind turbine having "free-flying" airfoils that self pivot according to the local dynamic conditions to which they are subjected. The motion of the airfoil about their axis is restricted to remain within limits set by stop mechanisms. The airfoil is allowed to passively—i.e., driven entirely by ambient wind conditions—pivot between a radially aligned and tangentially aligned limit. Another example of a passively controlled variable pitch vertical axis wind turbine with pitching motion constrained by stops is described in the U.S. patent application Ser. No. 11/475,459 by Jonsson.

Passive pitch control schemes generally enable better conversion of wind energy. U.S. Pat. No. 5,676,524 issued Oct. 14, 1997 to Lukas describes a VAWT having a "control plate" that can move with respect to the support structure along grooves for effecting pitch control. But allowable relative motion is restricted.

Power generation using an actively controlled blade pivoting motion can be more efficient. U.S. Pat. No. 4,247,253 issued Jan. 27, 1981 to Kazuichi Seki, et al. considers the use of active aerodynamic control for controlling the speed of a vertical axis wind turbine only for starting and braking (at excessive wind speeds) purposes. A mechanism for using spoilers for variable power control by regulated movement was presented in U.S. Pat. No. 4,500,257 issued Feb. 19, 1985 to Sullivan. U.S. Pat. No. 5,503,525 issued Apr. 2, 1996 to Brown, et al. describes a blade assembly for a vertical axis wind turbine that comprises of blades that can pivot about another vertical axis. It also describes that such a blade assembly, equipped with a wind direction measurement device and a shaft encoder, can include a control system to regulate the blade angle so that the lift component of the aerodynamic forces on the blade contributes positively to the driving torque on the rotor. However, it does not describe a specific strategy for implementing active control. U.S. Pat. No. 7,189,050 issued Mar. 13, 2007 to Taylor, et al. describes a method of increasing the efficiency of a vertical axis wind turbine through generation of a low-pressure area on a leading face of a rotor blade by using multiple stators.

Thus, there is a need for a system that improves the efficiency of power extraction capability of vertical axis wind turbines by integration of pitch, camber and generator control, and that enables efficient power extraction at any wind speed. Moreover, there is a need for a vertical axis wind turbine system that calibrates power extraction efficiency as a function of wind speed and pitch and camber control.

SUMMARY OF THE INVENTION

An aspect of the present invention provides a new vertical axis wind turbine that employs active control of individual blade pitch and camber, integrated with generator control. The wind turbine incorporates mechanisms that enable independent pitching of individual blades, and each blade is equipped with flaps that can be independently regulated for optimal camber control. A matrix converter is used for converting the variable frequency voltage generated by the wind turbine to single-phase or three-phase constant frequency voltage that will allow local use of power generated or interfacing with the electric grid.

Another aspect of the present invention provides a vertical axis wind turbine which includes a vertically-mounted shaft connected at a lower portion with an electrical generator and connected at an upper portion with one or more arms each for connecting one of a plurality of blades. The electrical generator is controlled by a generator control, and each blade also includes a pitch control for controlling the blade's pitch, which, in turn, is connected to a pitch control motor. Each blade further includes a camber control for controlling the blade's camber, which is connected to a camber control motor. In operation, the blade pitch and camber controls are integrated with the generator control.

Another aspect of the present invention includes the vertical axis wind turbine, wherein the camber control motor controls the blade's camber by rotating a flap hinge attached to a trailing edge of the blade, or, alternatively, wherein the camber control motor controls the blade's camber by elastically changing the shape of the blade.

Yet another aspect of the present invention includes the vertical axis wind turbine, in which the electrical generator uses permanent magnets in a Halbach configuration.

A telemetry collector for collecting operating telemetry and forwarding collected telemetry to a user using a wireless interface is also provided.

Another aspect of the present invention includes the vertical axis wind turbine integrated with a matrix converter.

In another aspect of the present invention, a vertical axis wind turbine system is provided which includes a plurality of vertical axis wind turbines in communication with a central controller for coordinating operation of the plurality of vertical axis wind turbines.

In another aspect of the present invention, a method of optimizing the efficiency of operation of a vertical axis wind turbine is provided. The method includes changing the blade pitch and camber in a fixed sequence and measuring the output torque, using the wind speed indication to compute lift and drag coefficients, and using these coefficients optimize blade positioning.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

Although every reasonable attempt is made in the accompanying drawings to represent the various elements of the embodiments in relative scale, it is not always possible to do so with the limitations of two-dimensional paper. Accordingly, in order to properly represent the relationships of various features among each other in the depicted embodiments and to properly demonstrate the invention in a reasonably simplified fashion, it is necessary at times to deviate from absolute scale in the attached drawings. However, one of ordinary skill in the art would fully appreciate and acknowledge any such scale deviations as not limiting the enablement of the disclosed embodiments.

The present invention advantageously provides for a vertical axis wind turbine to start up by itself and to operate at low wind speeds. It also provides for the integration of pitch, camber and generator control to improve the efficiency of power extraction capability of vertical axis wind turbines. It also enables efficient power extraction at any wind speed, and permits the turbine to operate at very high wind speeds without damage.

Figure 1:
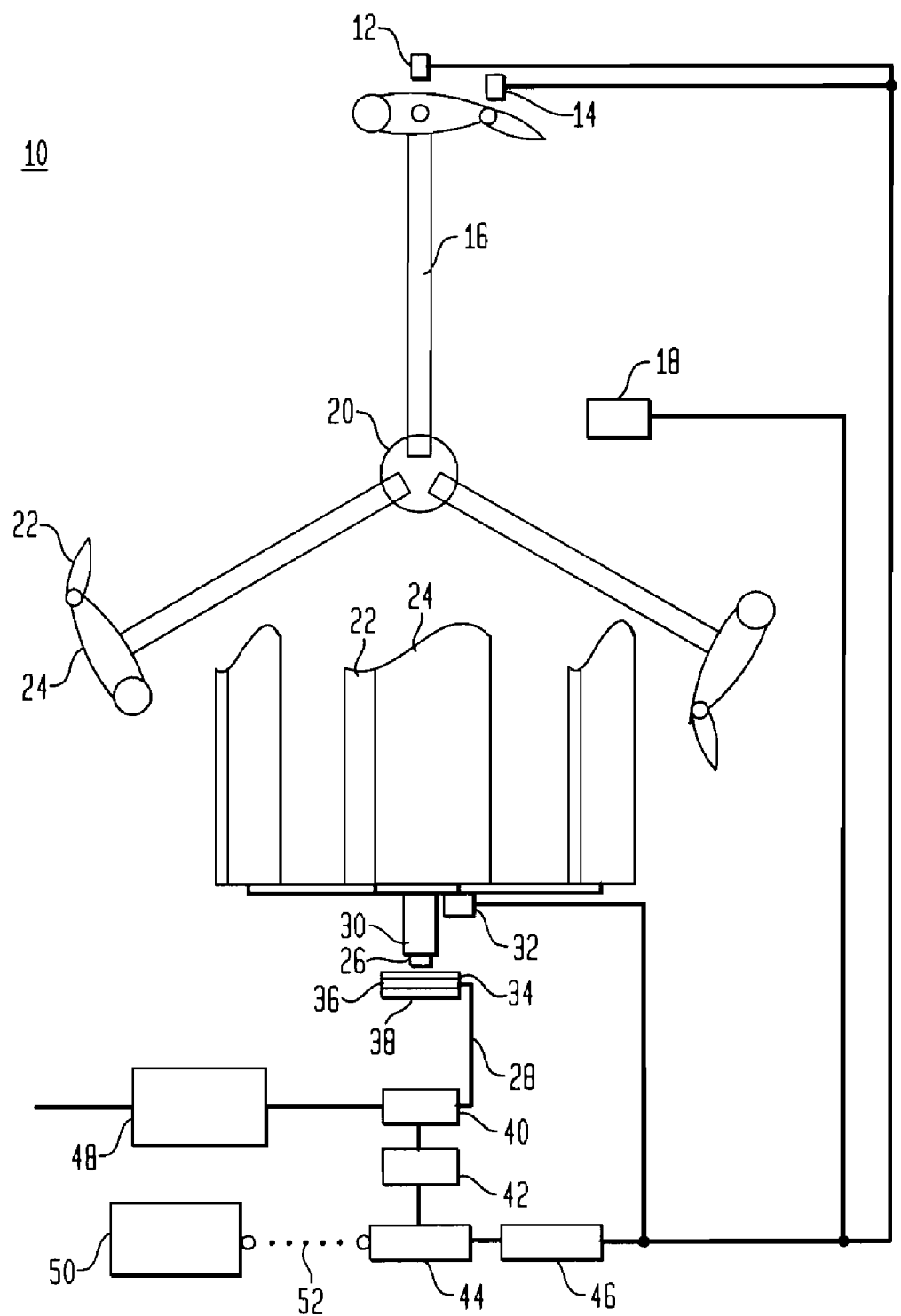
FIG. 1 is a schematic diagram illustrating a vertical axis wind turbine using individual blade pitch and camber control integrated with a matrix converter, in accordance with an embodiment of the present invention.

An embodiment, 10, of the invention is shown in FIG. 1. This figure shows three blades but any number of blades can be used, from one blade to numbers greater than or equal to two.

Pitch control of the blades is achieved using a motor 12. This allows the blades to be oriented optimally with respect to the wind. Motor 12 may be a servo-motor or a stepping motor.

The camber of the blades is changed using a motor 14. Motor 14 might simply rotate a flap hinge or might elastically change the shape of the blade to effect a change in camber. This changes the aerodynamic lift and drag coefficients of the blade. The change in camber is coordinated with the change in pitch to produce the desired torque in any wind condition. Again, the motor may be a servo-motor or a stepping motor. If the blade is deformable it may be one of any number of piezoelectric or other shape-change inducing actuators, without limitation.

The blades are attached to an arm which separates the blades to provide the desired swept area. One, two or more blades may be used. Power extraction increases incrementally with more blades, albeit with added cost and complexity. The incremental improvement in power extraction decreases with the number of blades. Component 16 is the arm that connects each blade to the central core in an embodiment of the invention. This arm may be located below, above or at any position along the blade elements. Multiple arms may be used for each blade. For example, one may be located at the top and one at the bottom. The number and location of arms is dependent on the length and stiffness of the blades.

In an embodiment of the invention, camber and blade pitch are modified as a function of the angle of the arm on which the blades are affixed, and of the wind speed and direction. In order to do this, the wind velocity vector is first determined. This may be done with device 18, which is the wind velocity and direction sensor. Many types of sensors can be used, including a simple weathervane with propeller, as well as more sophisticated ultrasonic sensors, without limitation.

Preferably, the arms are connected to a central hub 20, to which each arm is attached. This hub 20 may be a separate piece or may be a single piece in combination with connector component 16.

In operation, the motor 14 actuates component 22, the trailing edge flap, which is used to change the blade camber. Component 22 need not be a discrete element, and may instead be a deformable element.

Component 24 is the main part of the blade. In an embodiment of the invention, along with the trailing edge flap 22, component 24 forms the complete airfoil. Changing the shape of the airfoil changes the camber thus changing the lift and drag coefficients. The combined length of components 22 and 24 is chosen to optimize the aerodynamic performance of the system.

Mechanical bearings provide low friction rotation of the shaft. Unit 26 is the bearing assembly that connects the generator to the shaft. Use of low friction bearings are preferable, although not an absolute requirement.

The generator has multiple windings organized into electrical phases. Three phases produces maximal efficiency. Electrical connector 28 is the multi-phase wiring that connects the generator to the drive circuits.

Mechanical connector 30 is the shaft that connects the hub to the generator.

It is also preferable for generator control that the angle of the generator shaft be known. Device 32 is an angle encoder, which may be used to measure the angle of the generator shaft.

During operation, the electrical generator converts the rotational torque into power. In an embodiment of the invention, units 34, 36 and 38 make up the electrical generator. The preferred embodiment depicted in the drawings shows an axial flux generator, although use of a radial flux generator is alternatively envisioned.

Component 34 is the magnet assembly in the axial flux generator. The permanent magnets are arranged in a pattern to produce the desired flux in the air gap. This pattern could be in a Halbach configuration. A Halbach magnet array has a variable magnetic pole direction as a function of angle around the shaft. This keeps the magnetic flux in the air gap. The Halbach configurations produce a higher flux per magnet and eliminates the need for magnetic steel, thus lowering the mass and cost of the generator. Two magnet assemblies are used to produce a higher flux and to keep the magnetic field within the air gap. A single magnet assembly is also possible.

Component 36 is the coil assembly in the air gap. The coils may be wound in any number of phases, but three are typical.

In an embodiment of the invention, the magnets are affixed to the rotating shaft by means of structural component 38. This component provides structural support and maintains the desired air gap thickness.

The matrix converter 40 is an electrical unit providing control circuitry for the generator. The output may be single phase or multi phase. In an embodiment of the invention, six semiconductor switches are organized into pairs for bidirectional switching as required per phase. These may be MOSFETs for low power wind turbines and Integrated Gate Bipolar Transistors (IGBTs) for high power turbines. Each phase of the generator may be connected together in either a delta or a Y configuration. The configuration may be fixed or chosen actively depending on the operating condition of the generator. The output of unit 40 is an AC voltage. No DC link is required.

The generator requires high speed control since switching speeds of 1 kHz to 20 kHz are required for the matrix converter. In an embodiment of the invention, electronic unit 42 is the circuit that controls the generator. This consists of a digital signal processor and interface electronics. The interface electronics connect to the switches of the MOSFETS or IGBTs. The digital signal processor takes commands from the control computer 44 and current readings from the generator itself.

The overall control of the system may be accomplished with a central control computer. For example, in an embodiment of the invention, device 44 is the control computer. It takes in readings of generator current, angle encoder readings, and wind measurements to generate commands for the blade pitch and camber and for the generator. The control algorithms optimally select these commands to maximize power output in all wind conditions while minimizing stresses on the system. The control computer can connect wirelessly using IEEE 802.11 to any WIFI enabled computer. Other wireless standards can also be employed, without limitation.

Electrical connector 46 is the interface to the sensors and the actuators for the blades.

In an embodiment of the invention, the AC output is connected to the grid. Electrical component 48 is a grid-tie interface that takes the AC voltage and feeds it to the electrical grid. It includes all safety devices, such as disconnects, required by the local power company.

Device 50 is the computer of the wind turbine operator that takes data wirelessly from the control computer 44 to monitor the performance to the system. Device 50 may be any type of computer or processor board with a WIFI connection. Signal 52 represents the wireless link.

Figure 2:
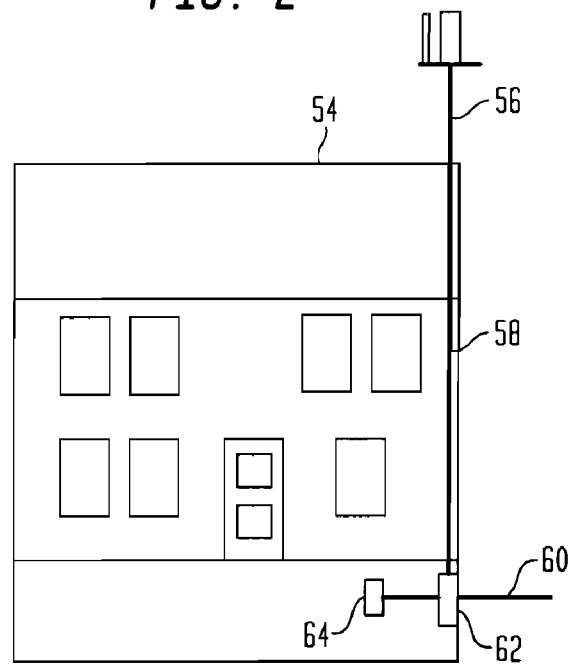
FIG. 2 is a schematic diagram illustrating a typical system installation, in accordance with an embodiment of the present invention.

FIG. 2 shows an exemplary installation of the system in a home 54. The mounting support 56 connects the generator base to the house. Electrical connector 58 is the DC cable from the rectifier to the grid-tie inverter 62, which connects to the circuit-breaker panel 64 and to the grid 60.

Figure 3:
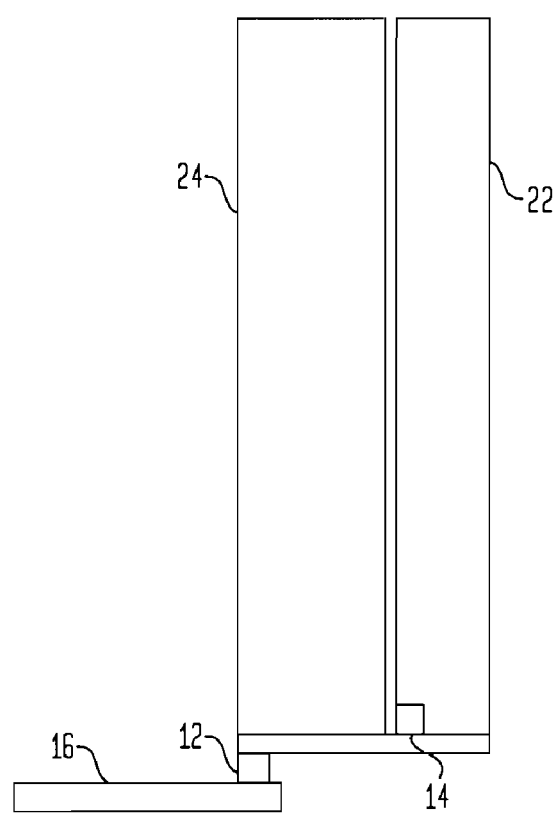
FIG. 3 is a diagram illustrating a blade, in accordance with an embodiment of the present invention.

FIG. 3 shows exemplary details of the blade assembly. Component 22 is the trailing edge flap which is used to change the blade camber. Component 24 is the main part of the blade. The flap motor 14 is embedded in the flap and attached to the base that also connects to the main part of the blade 24. The pitch motor 12 drives the entire assembly.

Figure 4:
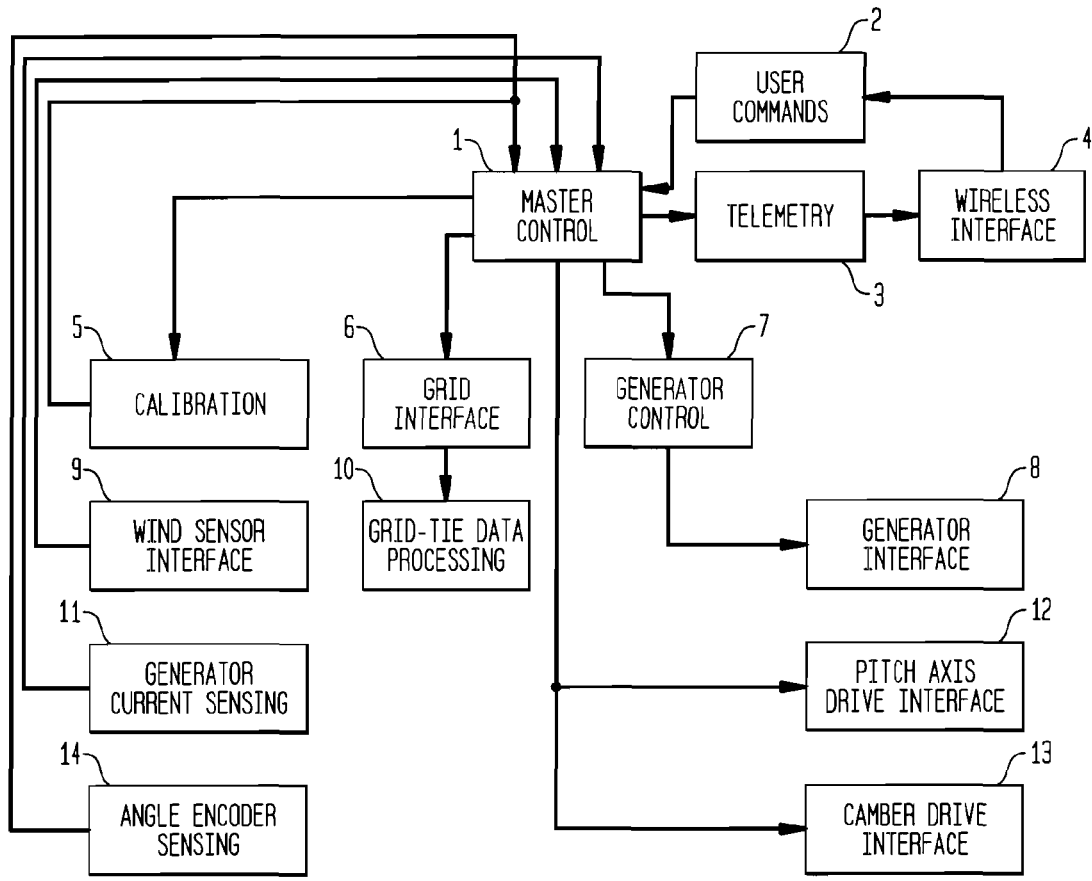
FIG. 4 is a flow chart illustrating processing of data and control by the controller; in accordance with an embodiment of the present invention.

FIG. 4 shows an exemplary block diagram of the controller interface. Block 1 is the master controller which controls all other blocks. Block 1 also coordinates the activities of the generator controller 7, the rectifier controller 6, the blade pitch control 12, and the camber drive 13, and sends telemetry to the telemetry block 3 and accepts user commands. Periodically, or on user command, block 1 puts the wind turbine into a calibration cycle 5. The master controller 1 can interface with other wind turbines via this interface and coordinate their operation if a user owns multiple wind turbines. When a matrix converter is being used the master controller integrates the matrix converter switching functions with the individual blade control by feedforwarding blade control laws and wind velocity estimates to the matrix converter controller.

The user may interact with the system via block 2, which accepts user commands through the wireless interface 4. This permits the user to use any personal computer to talk to the wind turbine to control the operation of the turbine. In an embodiment of the invention, this can be done using a Virtual Private Network (VPN).

Information needed to monitor the operation of the system is collected in block 3, which is the telemetry processing interface. It collects data on the various subsystems of the wind turbine and sends them via the wireless interface 4 to the user. This permits the user to monitor the performance of the turbine and its health.

In an embodiment of the invention, standard WiFi, IEEE 802.11 is used for communication by the wireless interface in Block 4. The wireless communication is encrypted so that only the owner can receive data or send commands. The generator may be connected to a VPN for security.

When the system is put into service or when problems are encountered, it may be necessary to recalibrate the wind turbine, which can be done through the calibration controller, block 5. During calibration the controller changes the blade pitch and camber in a fixed sequence and measures the output torque. Using the wind speed indication it computes the lift and drag coefficients so that the control system can optimize blade positioning. The calibration can be initiated on user command 2 or automatically. The generator may still produce power during calibration but it will not be the maximum possible power. During startup of the system, and for a period of time after startup, the turbine will switch into calibration mode at different wind speeds so that a table of lift and drag coefficients vs. wind speed can be generated. Over the life of the wind turbine this will be done to re-calibrate the wind turbine as it ages.

It is necessary to monitor the grid to determine if the wind turbine is properly interfacing with the grid. This is done in block 6.

Generator control is accomplished by commanding the switching of the matrix converter. Block 7 is the generator control. This controls the switching of the matrix converter. It communicates with the digital signal processor (DSP).

In an embodiment of the invention, the generator is controlled by a DSP. Block 8 is the interface to this DSP. This formats the generator control commands into the data words that the generator control chip accepts.

In operation, the wind sensor produces a 3-dimensional wind vector. Block 9 is the interface to the wind sensor, which measures wind direction and speed. The wind sensor vector is read in here and formatted for use by the control system.

The grid interface is in block 10. It collects grid data, including voltage, current and frequency, and formats it so that it can be used by the control computer.

Current measurements may also be used to control the generator. Block 11 is the interface to the generator current sensing. It reads in the data and formats if for use by the generator controller.

Motor interfaces are in block 12 and block 13. Block 12 is the interface to the pitch axis drive. This takes the pitch angle commands and formats it either into steps for a stepping motor or servo commands for a servomotor. Block 13 is the interface to the camber drive. This takes the pitch angle commands and formats it either into steps for a stepping motor or servo commands for a servomotor. If the camber control is a shape control it will send the shape command to the electronics that determines the blade shape.

The generator needs to know its angle to determine switching times. This is done via an angle encoder or other angle sensor. Block 14 is the angle sensor. It reads in angle encoder data and formats it for use by the control system.

Figure 5:
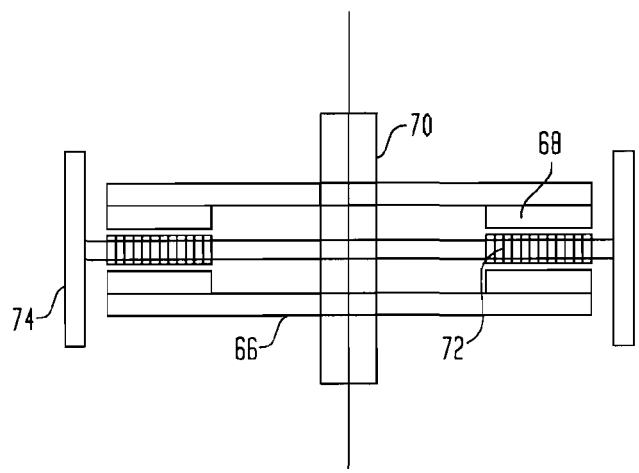
FIG. 5 is a cross-sectional view of a typical generator, in accordance with an embodiment of the present invention.

FIG. 5 shows details of an exemplary generator. Mechanical component 70 is the shaft attached to the blade assembly which is attached to the two disks 66, 68 with the permanent magnets. Component 74 is the stator and winding 72. Alternative generators may be employed, without limitation.

Figure 6:
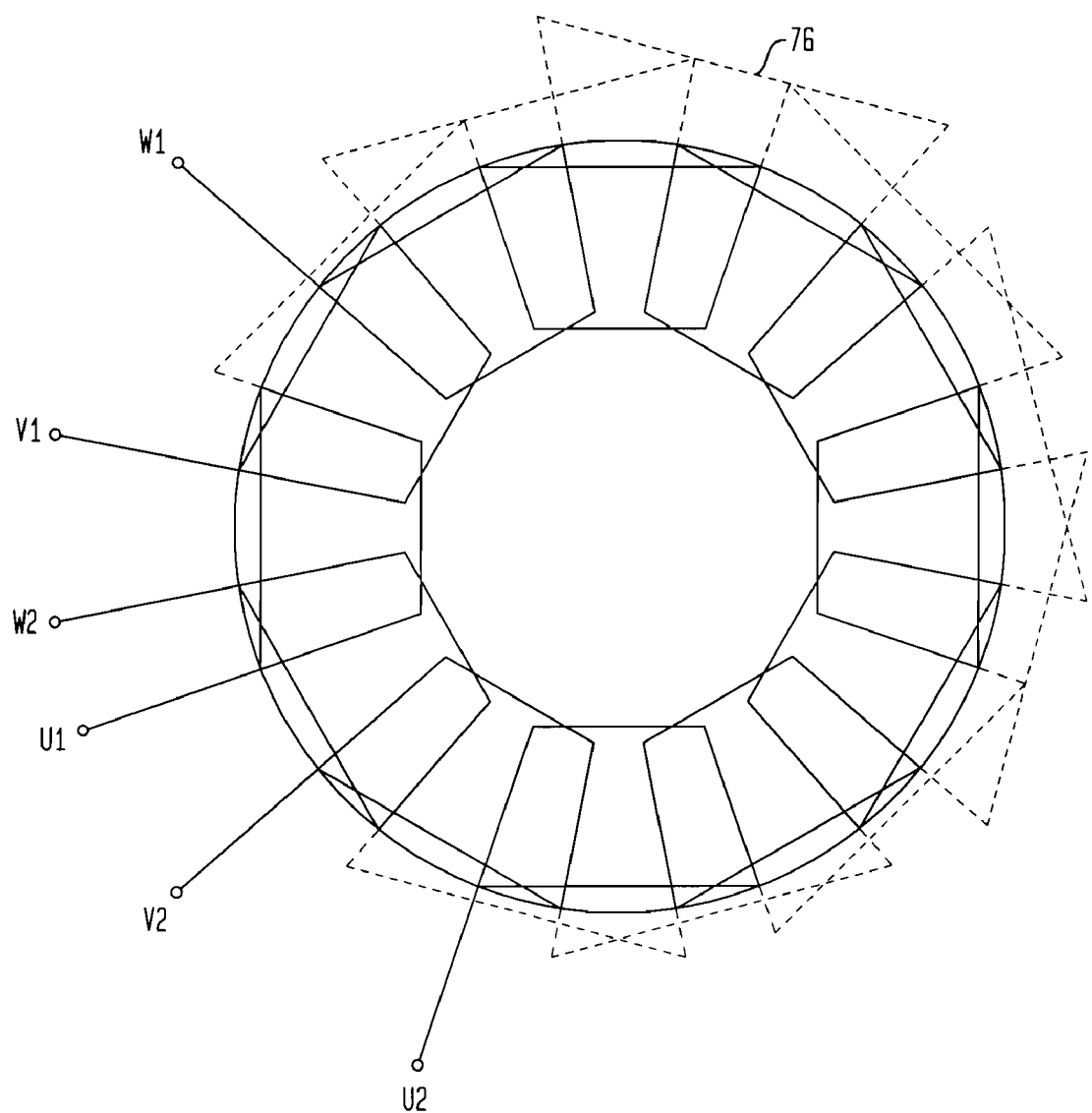
FIG. 6 is a diagram depicting an exemplary generator winding configuration, in accordance with an embodiment of the present invention.

FIG. 6 shows details of an exemplary winding assembly. Three phase windings may be realized using winding pattern 76.

Figure 7:
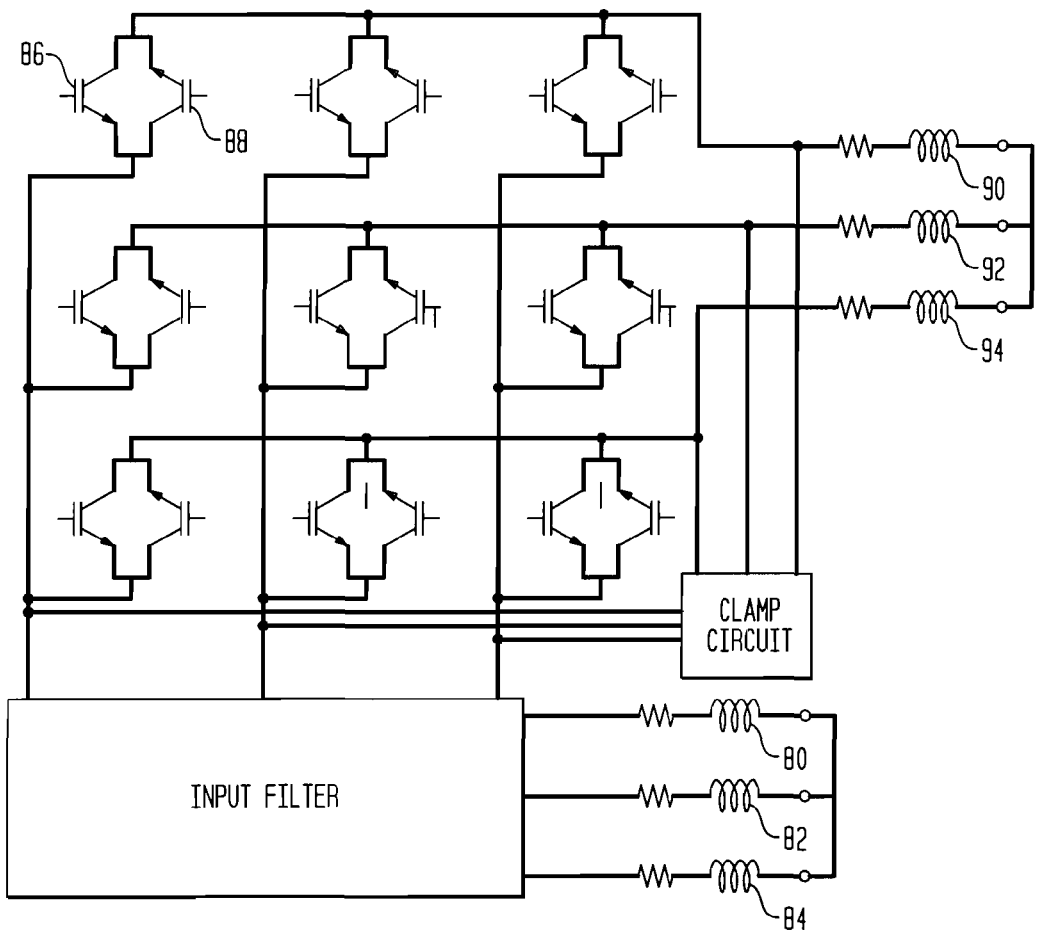
FIG. 7 is a circuit diagram depicting a realization of the matrix converter system, in accordance with an embodiment of the present invention.

FIG. 7 shows details of an exemplary matrix converter assembly. The matrix converter is an array of controlled semiconductor switches that can be used to convert variable frequency input to a variable output voltage with a specified, constant frequency. It does not have any dc-link circuit and does not need any large energy storage elements. Components 80, 82 and 84 show the three phase coils in the generator. Components 86 and 88 are two anti-paralleled NPT-IGBTs with reverse blocking capability. Together they form a semiconductor bidirectional switch. The clamp circuit provides overcurrent/overvoltage protection.

Figure 8:
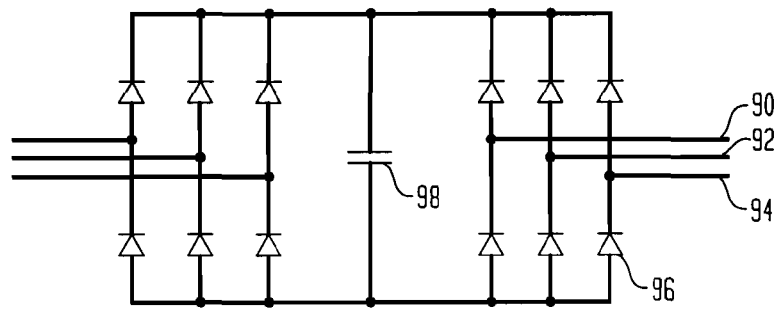
FIG. 8 is a circuit diagram depicting a realization of the clamp circuit of the matrix converter, in accordance with an embodiment of the present invention.

FIG. 8 shows the realization of a clamp circuit. For a 3phase-to-3phase matrix converter, the clamping circuit is realized using 12 fast recovery diodes 96 and a clamp capacitor 98. The input filter minimizes the high frequency components in the input currents and reduces the impact of perturbations of input power.

Figure 9:
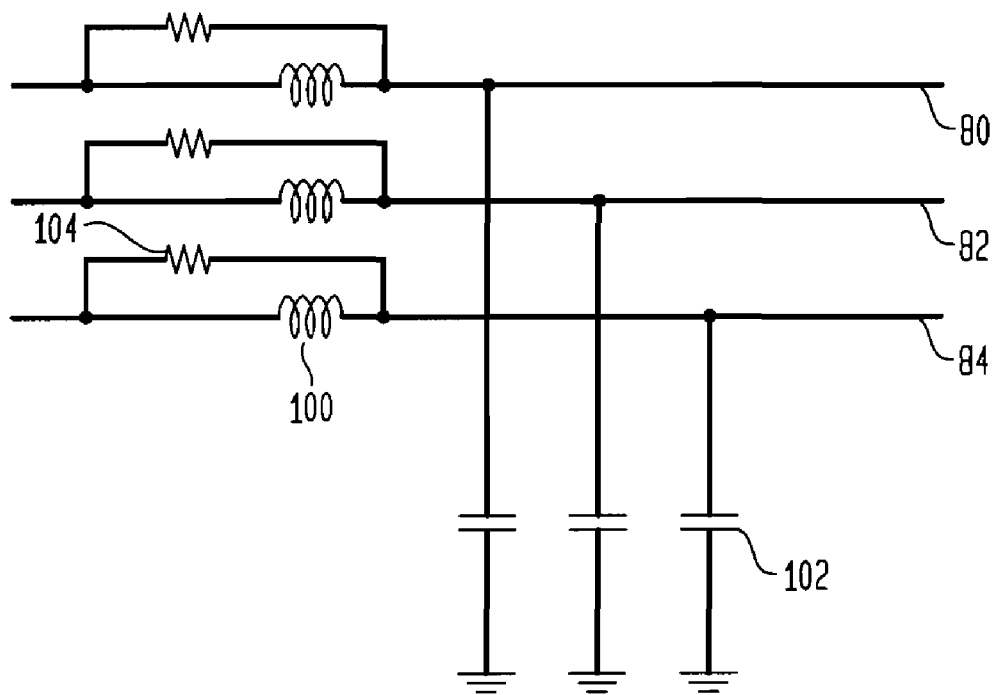
FIG. 9 is a circuit diagram depicting a realization of an input filter of the matrix converter, in accordance with an embodiment of the present invention.

FIG. 9 shows the realization of an exemplary input filter using an inductor 100—capacitor 102 combination, with parallel damping resistor 104.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A vertical axis wind turbine comprising:
   a vertically-mounted shaft connected at a lower portion with an electrical generator and connected at an upper portion with one or more arms each for connecting one of a plurality of blades, the electrical generator controlled by a generator control, wherein the electrical generator uses permanent magnets in a Halbach configuration;
   each blade further comprising a pitch control for controlling the blade's pitch, the pitch control connected to a pitch control motor; and
   each blade further comprising a camber control for controlling the blade's camber, the camber control connected to a camber control motor, wherein, the blade pitch and camber controls are integrated with the generator control; and,
   a telemetry collector for collecting operating telemetry and forwarding collected telemetry to a user using a wireless interface.

2. The vertical axis wind turbine according to claim 1, wherein the vertical axis wind turbine is integrated with a matrix converter.

* * * * *